Sept. 27, 1955  M. P. WINTHER  2,718,946
MAGNETIC DRIVE STRUCTURE
Filed Aug. 18, 1951  2 Sheets-Sheet 1
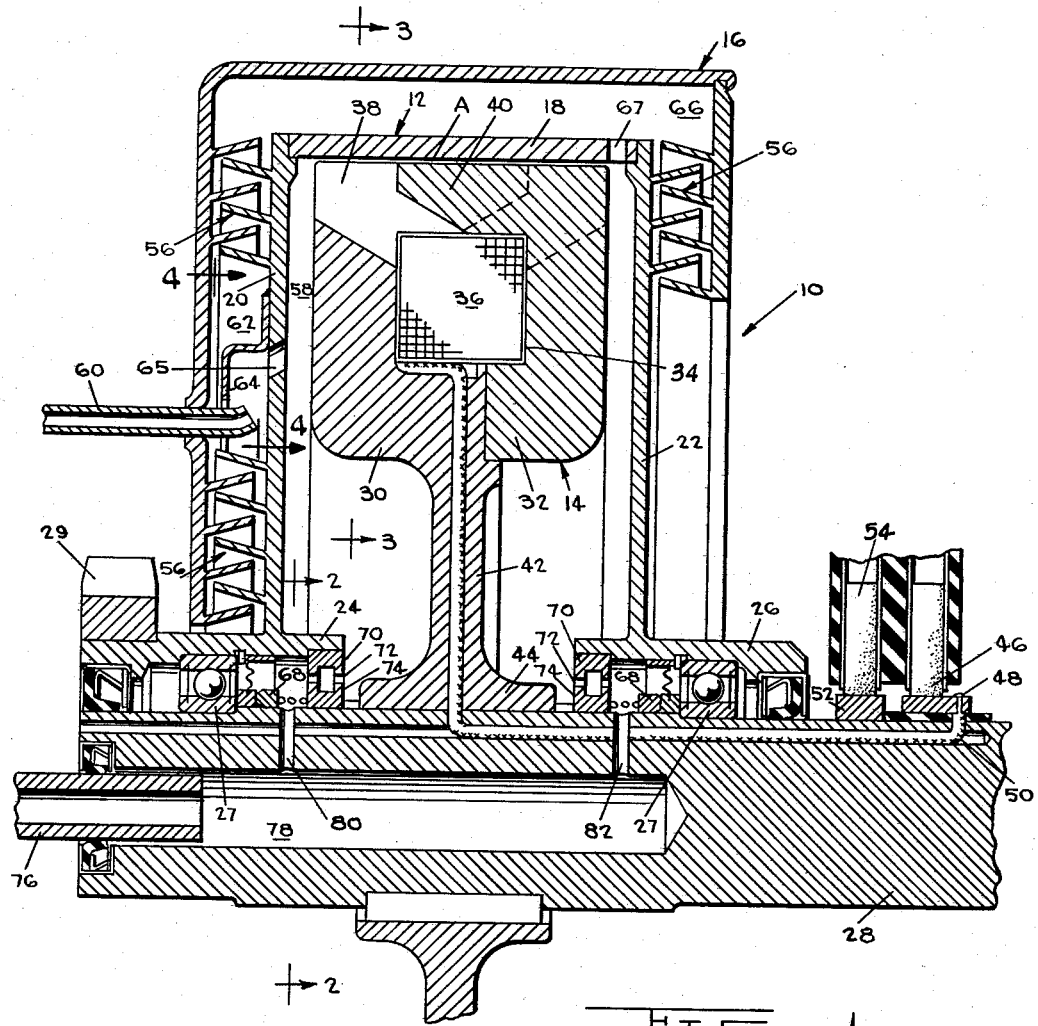
FIG_1
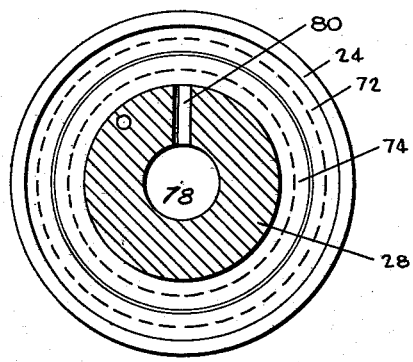
FIG_2
INVENTOR.
MARTIN P. WINTHER
BY
ATTORNEYS Sept. 27, 1955 M. P. WINTHER 2,718,946
MAGNETIC DRIVE STRUCTURE
Filed Aug. 18, 1951 2 Sheets-Sheet 2

INVENTOR.
MARTIN P. WINTHER
BY
McDonald & Teagno
ATTORNEYS

United States Patent Office 2,718,946
Patented Sept. 27, 1955

2,718,946

MAGNETIC DRIVE STRUCTURE

Martin P. Winther, Gates Mills, Ohio, assignor, by mesne assignments, to Eaton Manufacturing Company, Cleveland, Ohio, a corporation of Ohio Application August 18, 1951, Serial No. 242,490

23 Claims. (Cl. 192—21.5)

This invention relates to electromagnetic apparatus and more particularly to magnetic iron powder clutches or the like.

Broadly the invention comprehends the provision of magnetic clutches comprising cooperative relatively rotatable members wherein iron powder is utilized as a power transmitting or bridging vehicle between the members upon the establishment of magnetic flux flow between the members. The iron powder is mixed with water and an inhibitor, said inhibitor insuring against rusting and deterioration of the iron powder by the water and as such said resulting iron powder fluid mixture can be circulated through the clutch for the elective cooling thereof. Sealing means of novel construction are employed to prevent the iron powder from getting into the proximity of the bearings.

Among the several objects of the invention are the provision of a magnetic iron powder clutch:

1. That is capable of dissipating practically all of the energy at full slip;
2. That is capable of transmitting high torque at high slip;
3. That utilizes a mixture of iron powder, water and an inhibitor as a medium for high torque transmission and as a means for cooling the clutch;
4. That effectively circulates the iron powder fluid mixture through the clutch;
5. That effectively prevents the mixture from entry into the bearings chambers of the clutch tending toward the destruction thereof; and
6. That utilizes a combination of conventional seals and a slow feed of clear water therebetween to prevent the fluid mixture from entering the bearings chambers of the clutch.

Other objects and advantages of the invention will appear from the following description taken in connection with the drawings forming a part of the specification; and in which:

Fig. 1 is a fragmentary vertical cross-sectional view of a combination eddy current and iron powder fluid mixture clutch, constituting the invention;

Fig. 2 is a cross-sectional view taken substantially along lines 2—2 of Fig. 1;

Similar reference characters indicate corresponding parts throughout the several views of the drawings.

Figure 3:
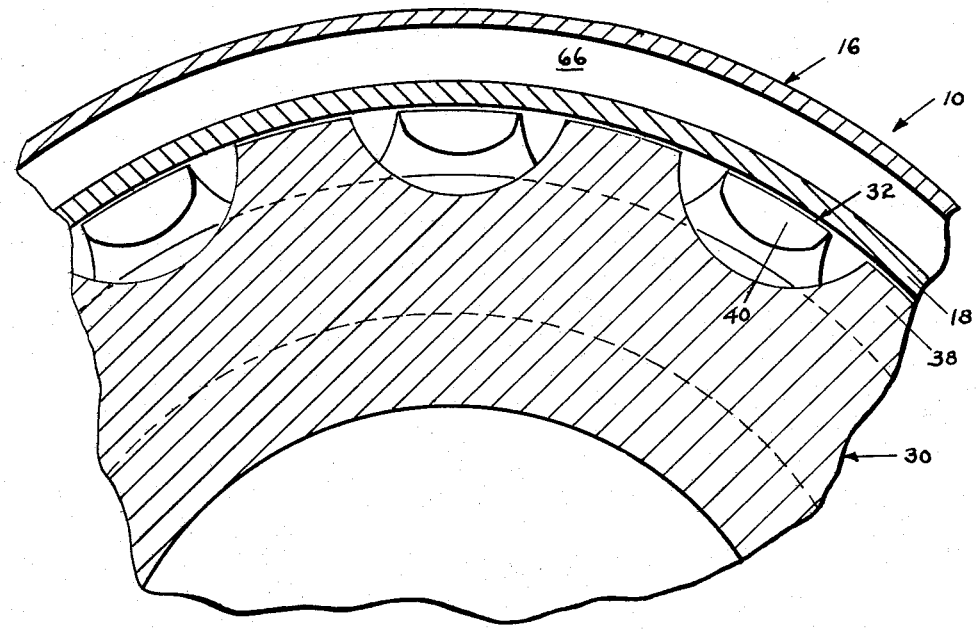
Fig. 3 is a fragmentary cross-sectional view taken substantially along lines 3—3 of Fig. 1.
Figure 4:
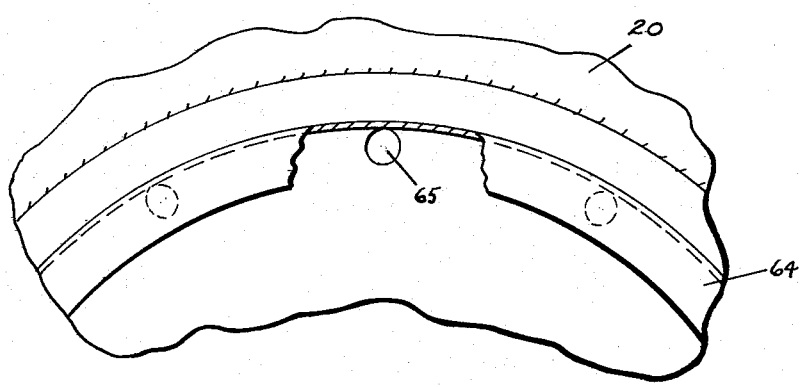
Fig. 4 is a fragmentary cross-sectional view taken substantially along lines 4—4 of Fig. 1.

This invention is directed primarily at the provision of a magnetic clutch that is capable of transmitting high torque at high slip and which is capable of dissipating practically all of the energy at full slip. These results are achievable through the utilization of iron powder in a mixture of water and inhibitor, wherein the iron powder is effective to transmit power between relatively rotatable members of the clutch, the water is effective to dissipate the heat generated by the clutch and the inhibitor in addition to protecting the iron powder from deterioration by the water provides for a colloidal suspension of the iron powder in the water.

As a necessity to the practical utilization of the iron powder fluid mixture to ensure prolonged operation of the clutch a combination of magnetic air gap seals and carbon ring seals are used in conjunction with the bearings for the clutch whereby through the introduction of slow feed clear water between the seals to the clutch chamber the fluid mixture in its circulation through the clutch is prevented from entering the bearing chambers. The clear water becomes admixed with the fluid mixture for the clutch for passage with the mixture out of the clutch chamber. It is then necessary in addition to removing the heat from the mixture to remove an equal amount of water as was fed thereto for sealing purposes so as to ensure a continued consistency of iron powder fluid mixture in the recirculation thereof through the clutch.

Referring to the drawings for more specific details of the invention 10 represents generally a combination eddy current and magnetic fluid mixture clutch comprising basically an input or drum member 12, an output or rotor member 14 and a stationary housing 16.

The drum member 12 includes an annular ring 18, and end plates 20 and 22 affixed upon opposite ends of the ring 18. The plates are each provided with hubs 24 and 26 respectively journalled on suitable axially spaced bearings 27 mounted on an output shaft 28, with hub 24 having fixedly secured thereto a driving gear 29 for rotating the drum through gearing with suitable power means, not shown.

The rotor member 14 comprises ring members 30 and 32 secured one upon the other and providing an annular opening 34 therebetween for receipt of a waterproof enclosed electromagnetic coil 36. The members 30 and 32 are each provided on their outer circumference with a plurality of circumferentially spaced opposite polarity teeth 38 and 40 respectively with said teeth arranged in interdigitated relation to one another in overlapping relation to the coil 36 and with their outer peripheral surfaces arranged in predetermined spaced relation to the inner peripheral wall of ring 18 of the drum. The ring member 30 is provided with a radial flange 42 and a hub 44 fixedly secured to output shaft 28 for supporting the rotor member 14.

Electrical current is supplied to the coil 36 from a suitable source by way of a brush 46 having current conducting engagement with a collector ring 48, insulatedly mounted on shaft 28, connected as by suitable electrical conduit 50 extending partially through shaft 28 and ring member 30 to one end of the coil. The opposite end of the coil is grounded back through the rotor and output shaft 28 to collector ring 52 and brush 54.

Housing 16 envelopes a major portion of the drum and provides on opposite sides thereof in conjunction therewith through sets of gland seals 56 of the herringbone or concentric ring interfitted type, the purpose of which will hereinafter appear.

A magnetic fluid mixture consisting of iron powder, water and an inhibitor is adapted to be supplied to clutch chamber 58 formed within the confines of the drum and output shaft by way of a pipe or conduit 60, extending into chamber 62 formed between the housing and drum from a suitable supply source, said mixture in turn being confined in annular channel member 64 affixed to the exterior of plate 20 of the drum from whence it passes through a plurality of circumferential spaced passages 65 arranged in plate 20 into chamber 58. The mixture is discharged from the chamber 58 in the course of its being circulated through the clutch by way of a plurality of circumferentially spacing openings 67 in ring 18 into a chamber 66 formed between the housing and drum axially between two sets of the gland seals 56. The mixture delivered to chamber 66 is in turn discharged therefrom and conducted back to the source of supply for its re-use and in the course of its return to the supply source can be made to pass through suitable coolers to extract heat present therein.

Suitable as inhibitors are copper sulfate and bentonite, with inhibitors such as bentonite being preferable because they cause a favorable colloidal suspension of the iron powder in the water.

Suitable carbon ring-metal ring axial engagement water seals 68 are provided in conjunction with each bearing 27 disposed axially inwardly of each bearing mounted intermediate the hubs 24 and 26 of end plates 20 and 22 and the output shaft 28. A pair of magnetic air gap seals 70 are provided arranged radially between the hubs 24 and 26 and the shaft 28 and spaced axially a short distance apart from the seals 68, the purpose of which will hereinafter appear.

The magnetic seals 70 each comprise a pair of permanent magnet material radially spaced annular channel members 72 and 74 with the channels facing each other.

Clear water is supplied to the chamber 58 of the clutch from a suitable source by way of a conduit 76 fitted in sealing relation in shaft 28, suitable interconnecting passages 78, 80 and 82 in the shaft, annular channels between seals 68 and 70, and axially between members 72 and 74 of the magnetic seals.

In a normal operational use of the clutch the drum 12 is driven from a suitable source of power by way of gear meshing relation of driving gear 29 therewith, and with the coil 36 energized, the magnetic fluid mixture is simultaneously fed into the clutch chamber 58 by way of conduit 60, channel member 64 and passages 65, whence because of the positioning of the respective inlet and outlet passages 65 and 67 the mixture is directed to pass through the annular space A between the outer surface of the rotor and the inner wall of the drum. With the mixture in the annular space or air gap between the rotor and drum and with the coil energized the rotation of the drum is transmitted to the rotor with the mixture as a power bridging or transmitting medium therebetween.

Any magnetic fluid mixture in excess of that forming the power bridging or transmitting medium in space A between the outer surface of the rotor and drum finds its way axially in the spaces provided between the alternate polar teeth 38 and 40, as seen in Fig. 3. These spaces are of sufficient size to provide for the continuous circulation of the mixture which is not operable to transmit power between the rotor and drum during a clutching operation, effective to absorb heat from that generated in the mixture in the space A under the condition of slip between the rotor and drum. This is possible since the magnetic lines of forces between the polar teeth 38 and 40 is not of such strength as to inhibit the passage of the magnetic fluid mixture therethrough.

Under conditions wherein high torque is being transmitted at high slip between the rotor and drum, eddy currents are generated therebetween but when power is transmitted without slip between the rotor and drum, wherein the mixture serves as a friction non-slipping medium therebetween, no eddy currents are generated.

The water of the mixture in its recirculation through the clutch under conditions of high slip absorbs the heat generated by the clutch so that upon the subsequent suitable cooling of the mixture the heat absorbed by the water can be removed therefrom thus permitting of an effective cooling of the clutch for the efficient and practical operation thereof.

For the purpose of ensuring against the mixture entering the bearing chambers of the clutch in the course of its passage through the clutch a slow flow of clear water is provided whereby it is fed to the clutch chamber 58 at the hub therefor serving to maintain the mixture in an outer peripheral zone of clutch chamber 58. The clear water in its passage to the clutch chamber is made to pass between water seals 68 and magnetic air gap seals 70 and through the air gap of the magnetic seals such that the water seals prevent leakage of water into the bearing chambers and the magnetic seals arrest any iron powder which may find its way to the hub zone of the clutch.

The clear water as fed into the clutch chamber 58 becomes admixed with the fluid mixture and is discharged with the mixture by way of passages 67 into chamber 66 of the housing.

Through the provision of means not shown the admixed water and mixture can be centrifuged or otherwise handled to an extent providing for the drawing off from the admixture an amount of water equivalent to the clear water fed to the clutch chamber so as to maintain the consistency of the mixture for recirculation use in the clutch. After the desired amount of water is drawn off from the admixture it is preferably passed through any conventional type cooler, not shown, and thence returned to the supply source available for re-use in the clutch.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. A magnetic clutch comprising relatively movable members having opposed face portions, said members providing in conjunction with one another a chamber, a magnetic fluid mixture, means for circulating the magnetic fluid mixture through the chamber of the clutch between the opposed face portions of the movable members, a fluid, means independent of the first means for feeding the fluid into the chamber of the clutch effective to force the mixture towards the outer annular portion of the clutch and inhibit passage of the mixture radially inwardly toward the axis of the clutch and means for establishing a magnetic field between said face portions of the members.

2. A magnetic clutch according to claim 1 wherein one of the members is provided with inlet and outlet passages communicating with the chamber and between which the magnetic mixture flows.

3. A magnetic clutch according to claim 2 wherein the member which does not have the inlet and outlet passages therein is provided with a passage communicating with the chamber through which the fluid is fed into the chamber.

4. A magnetic clutch according to claim 3 wherein a stationary housing is provided in partial enveloping relation to the member having the inlet and outlet passages therein and providing in conjunction therewith a chamber having communication with the inlet and outlet passages of the one member.

5. A magnetic clutch according to claim 1 wherein bearings support the movable members in journalled relation to one another, and fluid seals are provided intermediate the clutch chamber and the bearings.

6. A magnetic clutch according to claim 1 wherein the opposed face portions are radially spaced from one another to provide an annular space between the members, passages communicating with the clutch chamber are provided in one of the members located in an annular zone near the annular space between the members for the admittance and discharge of mixture to the clutch chamber, and a passage means communicating with the clutch chamber is provided in one of the members located adjacent the hub of the clutch for feeding the fluid to the chamber.

7. A magnetic clutch according to claim 6 wherein the members are rotatable relative to one another.

8. A magnetic clutch according to claim 7 wherein bearings support the members in journalled relation to one another.

9. A magnetic clutch according to claim 8 wherein fluid seals are provided for the bearings intermediate the clutch chamber and the bearings.

10. A magnetic clutch according to claim 9 wherein magnetic air gap seals are provided intermediate the fluid seals and the clutch chamber and wherein the passage means communicates with the clutch chamber by way of the air gap of the magnetic seals.

11. A magnetic clutch according to claim 10 wherein a stationary housing partially envelopes the member having the mixture admittance and discharge passages therein and provides in conjunction therewith a chamber communicating with the admittance and discharge passages.

12. A magnetic clutch according to claim 11 wherein a plurality of herringbone gland seals are provided, between the housing and member having the admittance and discharge passages therein, in conjunction with the chamber therebetween.

13. A magnetic clutch according to claim 6 wherein the member having the admittance and discharge passages therein partially envelopes the other member.

14. A magnetic clutch according to claim 13 wherein one of the members supports an electromagnetic coil.

15. A magnetic clutch according to claim 1 wherein the mixture comprises iron powder, water and an inhibitor.

16. A magnetic clutch according to claim 13 wherein the admittance and discharge passages in the one member are disposed on opposite axial sides of the face portion of the other member.

17. A magnetic clutch according to claim 16 wherein a shaft is affixed to the enveloped member and wherein the fluid passage means is provided in the shaft in communication with the clutch chamber.

18. A magnetic clutch according to claim 17 wherein bearings and fluid seals for the bearings are provided mounted between the member having the admittance and discharge passages and the shaft, with the seals intermediate the clutch chamber and the bearings.

19. A magnetic clutch according to claim 18 wherein the passage means communicates with the clutch chamber adjacent the fluid seals oppositely disposed from the bearings.

20. A magnetic clutch according to claim 19 wherein magnetic air gap seals are mounted between the member having the admittance and discharge passages and shaft and intermediate the clutch chamber and fluid seals.

21. A magnetic clutch comprising relatively movable members having opposed face portions forming the inner cylindrical surface of one member and the outer cylindrical surface of the other member, said members providing a chamber in conjunction with one another, a magnetic fluid mixture, means for circulating the magnetic fluid mixture through the chamber of the clutch and between the opposed face portions of the members, a fluid, means for feeding the fluid into the chamber radially inwardly of the means for circulating the magnetic fluid mixture so as to inhibit the passage of the magnetic fluid mixture radially inwardly toward the axis of the clutch and means for establishing a magnetic field between said face portions of the members.

22. A clutch according to claim 21 wherein one of the members supports the other member for rotation thereon, and wherein the fluid is fed to the chamber adjacent and axially between the rotation support between the members effective to prevent the passage of magnetic fluid mixture to the rotation support between the members.

23. A clutch according to claim 21 wherein the magnetic fluid mixture comprises magnetic particles, liquid and an inhibitor and wherein the fluid is a liquid.

References Cited in the file of this patent

UNITED STATES PATENTS

| | | |
|---|---|---|
| 2,343,304 | Labrie | Mar. 7, 1944 |
| 2,453,509 | Hugin | Nov. 9, 1948 |
| 2,575,360 | Rabinow | Nov. 20, 1951 |

FOREIGN PATENTS

| | | |
|---|---|---|
| 976,917 | France | Mar. 23, 1951 |

OTHER REFERENCES

Technical News Bulletin, National Bureau of Standards, vol. 34, Number 12, pages 169–174, December 1950.